US011313423B2

(12) United States Patent
Taylor et al.

(10) Patent No.: US 11,313,423 B2
(45) Date of Patent: Apr. 26, 2022

(54) CALIPER GUIDE ASSEMBLY

(71) Applicant: Meritor Heavy Vehicle Braking Systems (UK) Limited, Gwent (GB)

(72) Inventors: Martin P. Taylor, Gwent (GB); Sean Cleary, Gwent (GB); Matthew McGinn, Gwent (GB); Refaat Malki, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 0 days.

(21) Appl. No.: 17/066,749

(22) Filed: Oct. 9, 2020

(65) Prior Publication Data

US 2021/0025464 A1    Jan. 28, 2021

Related U.S. Application Data

(63) Continuation of application No. 16/188,704, filed on Nov. 13, 2018, now Pat. No. 10,801,566.

(30) Foreign Application Priority Data

Nov. 29, 2017 (EP) .................................... 17204446

(51) Int. Cl.
*F16D 66/02* (2006.01)
*F16D 55/2265* (2006.01)
*F16D 65/00* (2006.01)
*F16D 55/227* (2006.01)
*F16D 55/00* (2006.01)

(52) U.S. Cl.
CPC ..... *F16D 55/22655* (2013.01); *F16D 55/227* (2013.01); *F16D 65/0087* (2013.01); *F16D 66/025* (2013.01); *F16D 66/026* (2013.01); *F16D 66/028* (2013.01); *F16D 2055/007* (2013.01); *F16D 2250/0084* (2013.01)

(58) Field of Classification Search
CPC ............ F16D 55/22655; F16D 55/227; F16D 65/0087; F16D 66/025; F16D 66/026; F16D 66/028; F16D 2055/007; F16D 2250/0084
See application file for complete search history.

(56) References Cited

U.S. PATENT DOCUMENTS 4,280,594 A * 7/1981 Baum .................... F16D 66/025
                                                                188/1.11 W
4,374,375 A    2/1983 Allori et al.
(Continued)

FOREIGN PATENT DOCUMENTS

| EP | 2708771 A1 | 3/2014 |
| EP | 2942541 A1 | 11/2015 |
| EP | 3101301 A1 | 12/2016 |

OTHER PUBLICATIONS

European Patent Office, Extended European Search Report for Application Serial No. EP17204446.3-1012, dated May 16, 2018.

*Primary Examiner* — Thomas W Irvin
(74) *Attorney, Agent, or Firm* — Brooks Kushman PC

(57) ABSTRACT

A caliper guide assembly for a heavy vehicle disc brake. The caliper guide assembly may include a wear sensor arranged to detect the position of a guide pin in relation to a guide bore. The guide pin and a guide surface may have different cross sectional profiles to define at least one void therebetween. The wear sensor may be at least partially accommodated within the void.

20 Claims, 9 Drawing Sheets

(56) References Cited

U.S. PATENT DOCUMENTS

| | | | |
|---|---|---|---|
| 5,087,907 A * | 2/1992 | Weiler | F16D 55/22655 188/1.11 L |
| 5,632,359 A | 5/1997 | Camps et al. | |
| 6,272,914 B1 * | 8/2001 | Ciotti | F16D 55/22655 188/11 |
| 6,481,539 B1 * | 11/2002 | Shaw | F16D 55/22655 188/1.11 E |
| 7,322,447 B2 | 1/2008 | Deckhut et al. | |
| 7,331,427 B2 * | 2/2008 | Mohr | F16D 55/22 188/1.11 E |
| 8,051,958 B1 | 11/2011 | Rockwell et al. | |
| 9,279,468 B1 * | 3/2016 | Philpott | F16D 55/2265 |
| 9,618,067 B2 * | 4/2017 | Philpott | F16D 65/568 |
| 9,845,837 B2 | 12/2017 | Thomas | |
| 10,233,984 B2 | 3/2019 | Evans, Jr. et al. | |
| 2004/0159512 A1 * | 8/2004 | Mohr | F16D 65/0012 188/218 XL |
| 2009/0200122 A1 | 8/2009 | Bagge et al. | |
| 2015/0323022 A1 | 11/2015 | Thomas | |
| 2016/0356325 A1 | 12/2016 | Knoop | |
| 2018/0080510 A1 | 3/2018 | Thomas | |
| 2019/0195299 A1 | 6/2019 | Knoop | |
| 2021/0270334 A1 * | 9/2021 | Taylor | B60T 17/22 |

\* cited by examiner

CALIPER GUIDE ASSEMBLY

CROSS-REFERENCE TO RELATED APPLICATIONS

This application is a continuation of U.S. application Ser. No. 16/188,704, filed Nov. 13, 2018, the disclosure of which is hereby incorporated in its entirety by reference herein.

TECHNICAL FIELD

The present invention relates to a disc brake and particularly but not exclusively to a guide assembly for slidably mounting a caliper of a disc brake, and may incorporate a wear sensor.

BACKGROUND

Disc brakes are commonly used for braking heavy vehicles such as trucks, buses and coaches.

Disc brakes conventionally comprise a brake carrier and a caliper. The brake carrier is arranged to carry brake pads on each side of a rotor. The caliper is slidably mounted on the brake carrier by two or more guide assemblies, such that when the disc brake is actuated, the caliper is able to slide with respect to the brake carrier so that both brake pads are urged onto a rotor in a clamping action to effect braking.

A guide assembly typically comprises a guide pin along which the caliper can slide, and a bore disposed in the caliper for receiving the guide pin.

To achieve free sliding of the caliper in a broad range of operating conditions, the guide assemblies must take account of manufacturing tolerances, effects of heating or cooling in use, and accommodate deflections of the disc brake due to the braking torque.

In addition, it is desirable for the vehicle operator to be provided with the wear status of the brake pad friction material in order to be notified when brake pads are to be changed, to maintain safe operation of the disc brake. However, known wear sensing arrangements may be costly and can restrict the design of other parts of the brake. Further, known arrangements may be susceptible to environmental contamination and damage.

SUMMARY

The present invention seeks to alleviate the problems associated with the prior art.

Accordingly, a first aspect of the invention provides a caliper guide assembly for a heavy vehicle disc brake. The caliper guide assembly comprising: a guide pin having a guide portion, a guide bore having a guide surface arranged to receive the guide portion and permit relative axial sliding thereof, and a wear sensor arranged to detect the position of the guide pin in relation to the guide bore, wherein a void is provided radially between the guide portion and the guide bore and the wear sensor is at least partially accommodated within the void.

Advantageously, this arrangement enables otherwise redundant space in the disc brake to be used for wear sensing. Further the space is well protected from the surrounding environment.

Optionally, the guide portion and the guide surface have different cross-sectional profiles to define the void along at least part of their length.

Optionally, the guide surface has a non-circular, preferably substantially constant cross section.

Advantageously, it has been found generally easier to manufacture a guide surface that is non-circular rather than a non-circular pin.

Optionally, the guide surface has an oval cross section.

Advantageously, an oval cross-section has been found effective for smooth guidance whilst providing space for the wear sensor.

Optionally, the guide pin has a substantially circular, preferably substantially constant outer profile.

Advantageously, this arrangement has been found simple to manufacture.

Optionally, the bore is a through bore and the assembly further comprises a cover to close one opening of the through bore and wherein the wear sensor is optionally mounted to the cover.

Advantageously the cover inhibits the contamination of the guide assembly and wear sensor and by optionally mounting the wear sensor to the cover, fitting and removal of the sensor may be simplified, and the cover may provide a secure mounting.

Optionally, the sensor comprises a portion overmolded or at least partially encapsulated into the cover.

Advantageously, this is an effective way of manufacturing the cover whilst also protecting the sensor.

Optionally, the wear sensor extends from the cover into the void in a self-supporting manner.

Optionally, the guide surface is a surface of a bush separately mounted to the bore.

Advantageously, using a bush allows suitable guide material to be used that may differ from that of the brake caliper. If the guide surface has a non-circular inner profile, manufacturing this in a bush may simplify its shaping.

Optionally, the bore is provided in a caliper of a heavy vehicle disc brake.

Advantageously, providing the bore in the caliper may permit a more compact brake to be achieved compared to providing it in the carrier.

Optionally, the guide pin further comprises a mounting portion configured for mounting to a brake carrier of a heavy vehicle disc brake.

Optionally, the sensor is a Hall Effect sensor or an optical sensor.

Advantageously, both of these types of sensor are compact, inexpensive and reliable.

A second aspect of the present invention provides a disc brake incorporating a caliper guide assembly according to the first aspect of the present invention.

Optionally, the heavy vehicle disc brake further comprises a second caliper guide assembly.

Optionally, the second caliper guide assembly comprises a second guide pin having a second guide portion and a second guide bore having a second guide surface, wherein the second guide portion and a second guide surface have substantially the same cross-sectional profiles.

A third aspect of the present invention provides a caliper guide assembly for a heavy vehicle disc brake. The caliper guide assembly comprising: a guide pin having a guide portion, a guide bore having a guide surface arranged through to receive the guide portion and permit relative axial sliding thereof, and a wear sensor arranged to detect the position of the guide pin in relation to the guide bore, wherein a void accessible from an opening of the guide bore is provided within the assembly and the wear sensor is at least partially located within the void.

Optionally, the void may be at least partially provided within a recess of the guide pin.

Advantageously, this permits additional space to accommodate the sensor.

Optionally, the sensor directly senses the position of the guide pin with respect to the sensor.

Advantageously, this arrangement avoids the need for additional components, such as magnets that interact within the sensor.

A fourth aspect of the present invention provides a wear sensor for use in a caliper guide assembly, the wear sensor comprising a probe configured to extend into a void between a guide pin and a bore of the caliper guide assembly.

Optionally, the wear sensor is arranged to mount to an inboard end of the bore, and the probe is arranged to extend outboard therefrom.

Optionally, the wear sensor is mounted to a cap arranged to close an inboard end of the bore.

BRIEF DESCRIPTION OF THE DRAWINGS

Embodiments of the present invention will now be described, by way of example only, with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
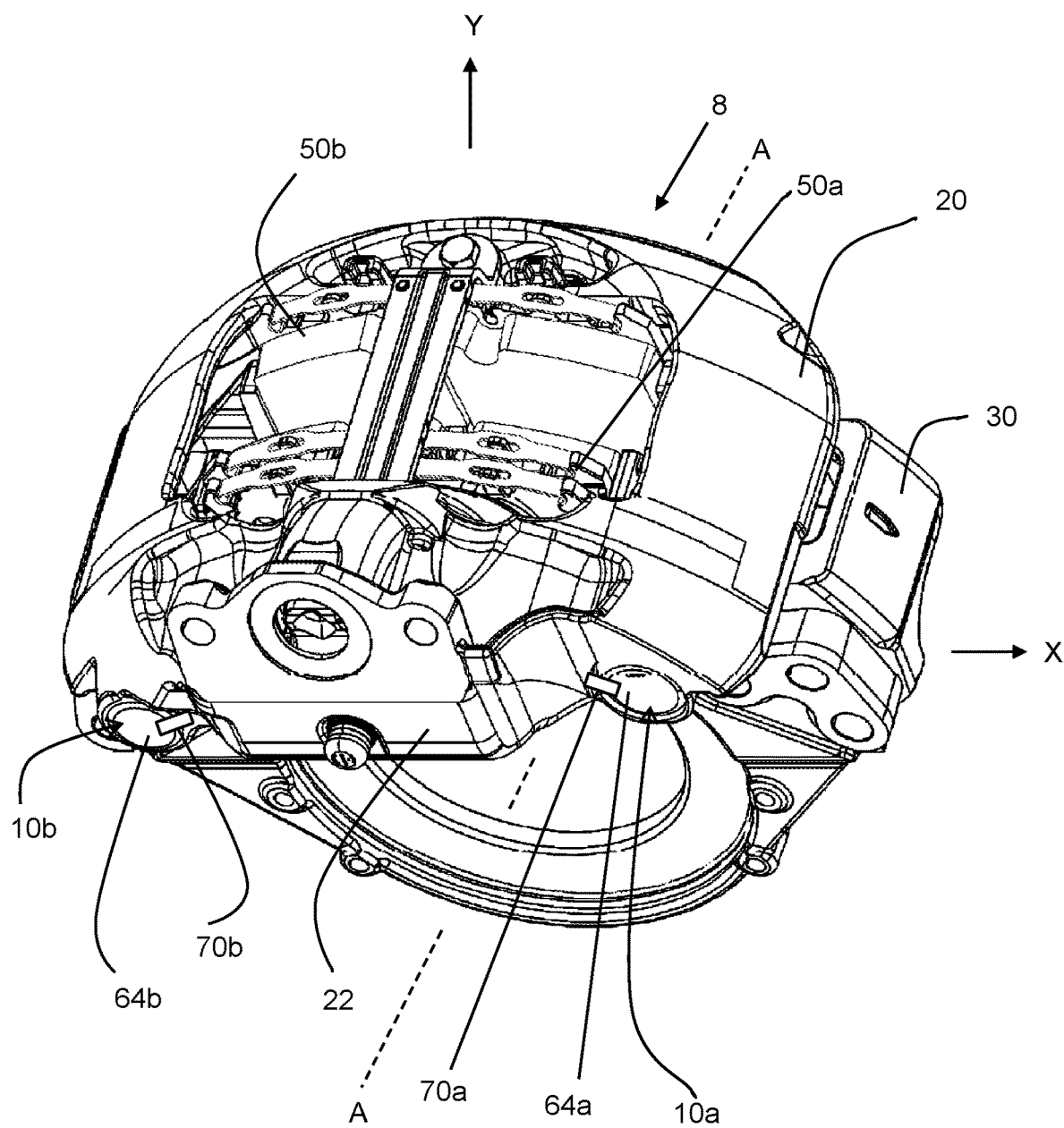
FIG. 1 is an isometric view of a disc brake having the guide assembly of a first embodiment and second embodiment of the present invention.

FIG. 1 depicts an embodiment of a disc brake 8. The disc brake comprises a caliper 20 slidably mounted with respect to a brake carrier 30 by two guide pin assemblies. The caliper 20 has a housing 22 typically formed from cast iron or steel. The brake carrier 30 is typically also formed from cast iron or steel.

The brake carrier 30 carries an inboard brake pad 50a and an outboard brake pad 50b. A rotor 40 (see FIG. 2), rotatable about an axis extending in the axial direction A, is positioned between the brake pads. An air actuator (not shown) is provided to move the inboard brake pad 50a into frictional contact with the rotor via an actuation mechanism (not shown) housed within the caliper housing 22 and which acts on the inboard brake pad 50a. When the inboard brake pad 50a is pushed towards and contacts the rotor, the caliper 20 is then caused to slide inboard along first and second caliper guide assemblies 10a and 10b.

As the caliper 20 slides inboard, it moves the outboard brake pad 50b towards the rotor 40. Hence, the rotor 40 becomes clamped between the inboard and outboard brake pads and the rotation of the rotor is frictionally inhibited.

So as to minimize the potential for the sliding of the caliper 20 to be prevented or restricted due to jamming or binding of the guide assemblies caused by thermal expansion, deflection under load, wear or the like, the first guide assembly 10a has a void to allow for free running of the guide assemblies even if the guide assembly is not in its nominal position. The first guide assembly 10a is a guide assembly according to a first embodiment of the present invention.

The second guide assembly 10b is longer than the first and comprises a circular guide bush and a complementary circular guide sleeve. The second guide assembly 10b is a guide assembly according to a second embodiment of the present invention. Although the disc brake 8 is shown with guide assemblies according to both a first and second embodiment of the present invention, in practice a disc brake would typically be fitted with either one or the other guide assemblies of the present invention and the other assembly would be conventional.

Figure 2:
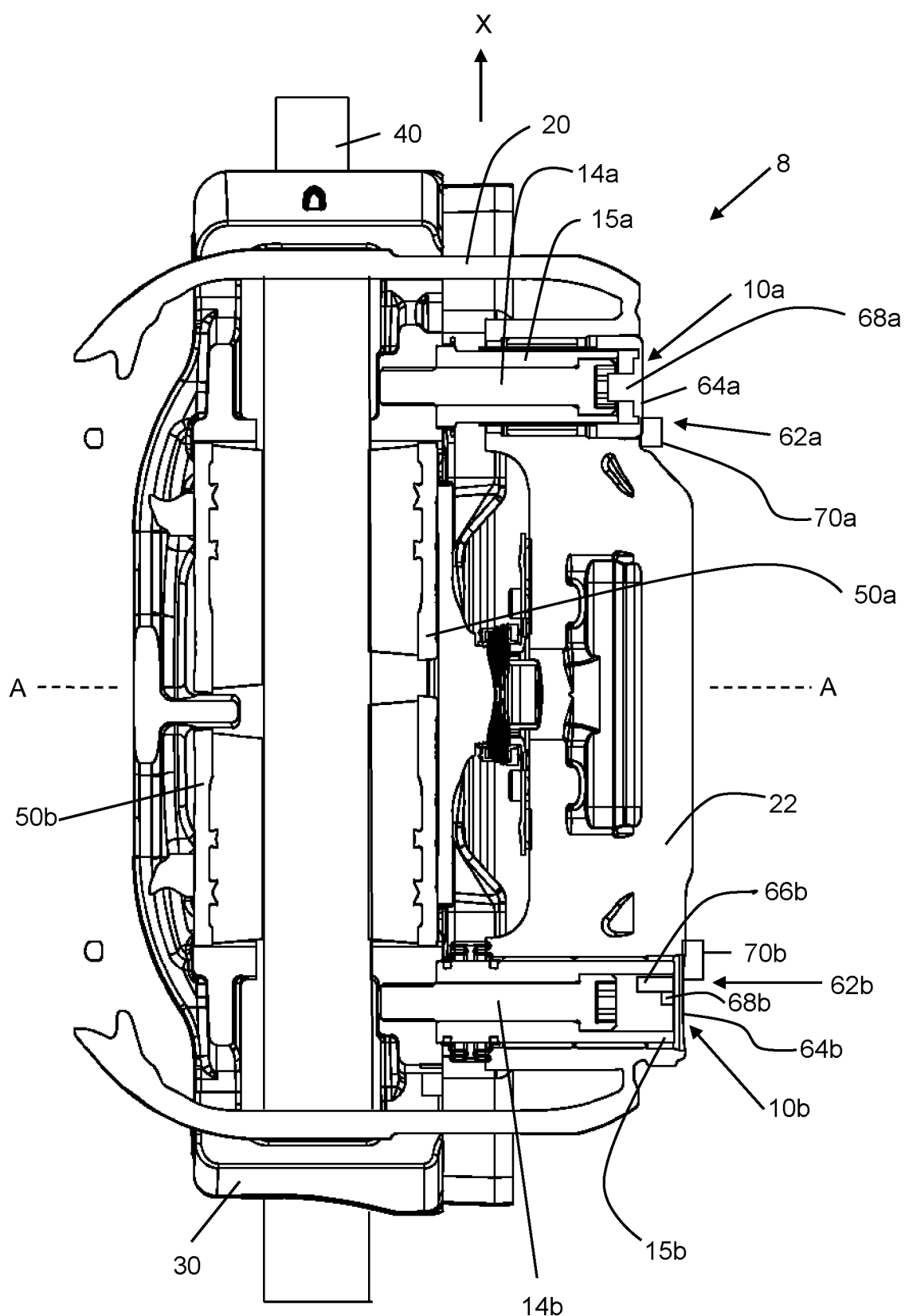
FIG. 2 is a plan cross-sectional view of the guide assemblies shown in FIG. 1 on a plane through the center of both guide assemblies with the caliper in a position with the brake pads unworn.
Figure 3:
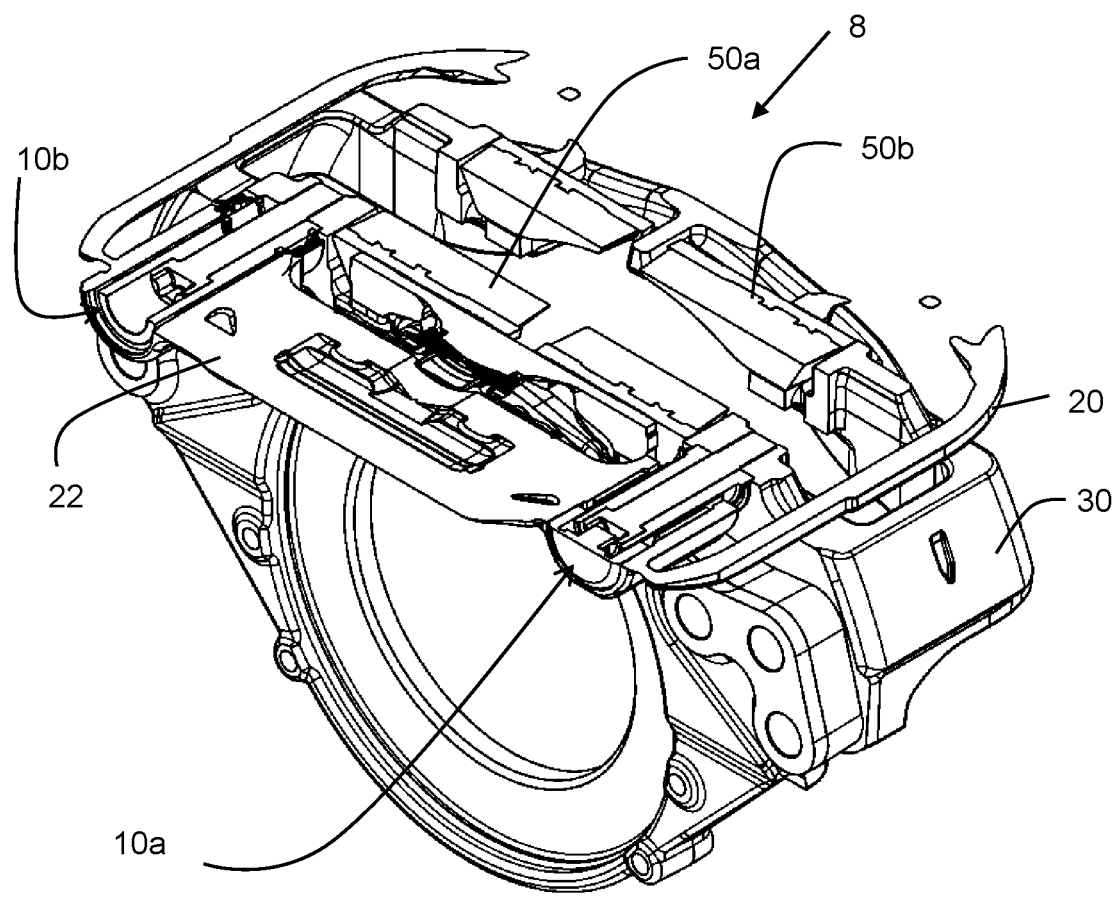
FIG. 3 shows an isometric view of the same cross-section as FIG. 2.
Figure 6:
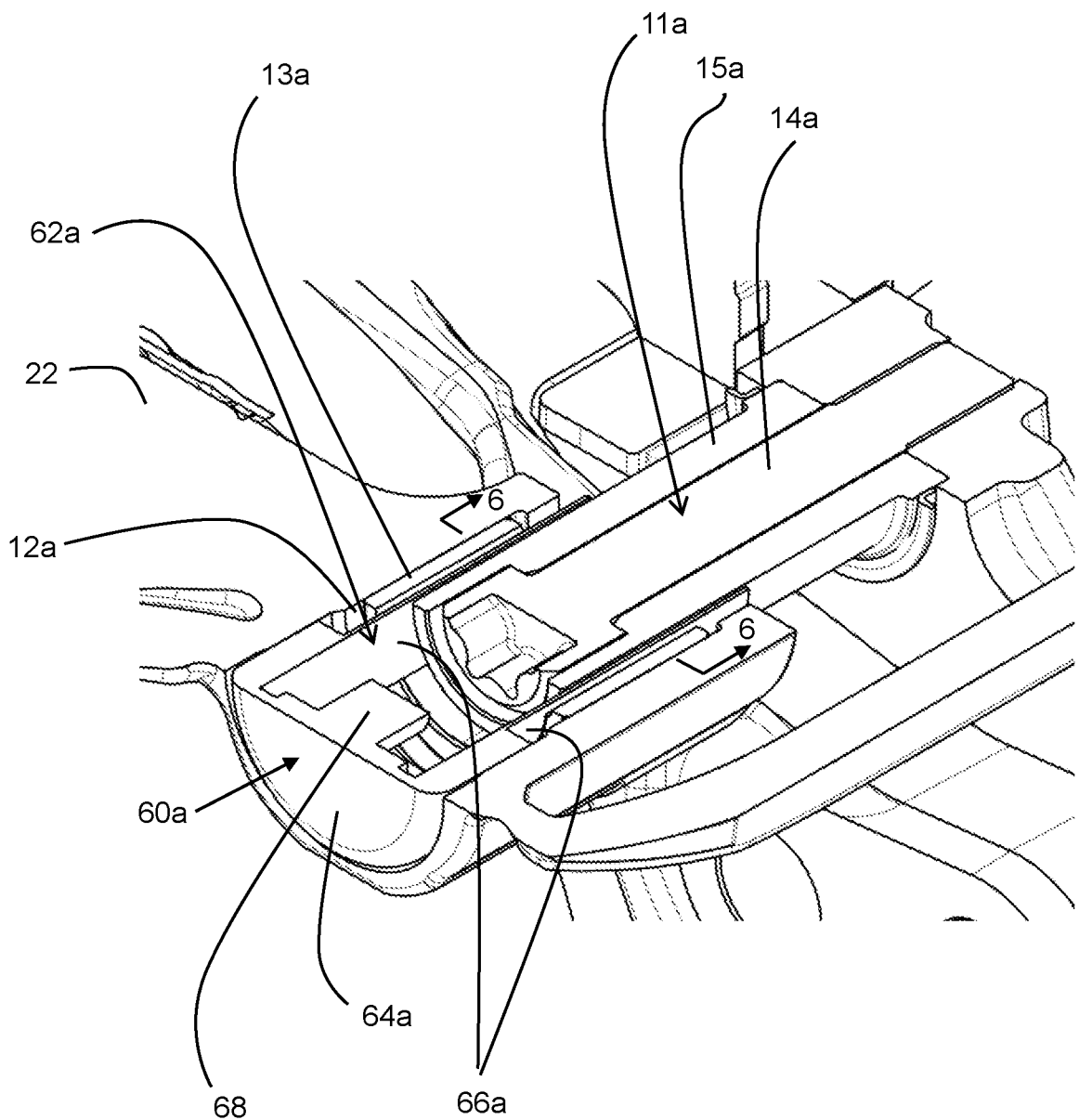
FIG. 6 shows an enlarged cross-sectional view of the guide assembly of the first embodiment of the present invention.

With reference to FIGS. 2, 3 and 6 the first guide assembly 10a, comprises a bore 12a extending parallel to axis A through the housing 22. The bore 12a has a circular cross-sectional profile to receive a guide pin 11a and at least one guide bush 13a with a circular outer profile and a non-circular, e.g., oval, inner profile to guide the guide pin within the bore.

The guide pin 11a comprises a fastener to secure the guide pin to the brake carrier 30. In this first embodiment the fastener is a bolt 14a that affixes to the brake carrier 30 by screwing into a threaded bore in the brake carrier.

With particular reference to FIG. 6, the guide pin 11a further comprises a guide sleeve 15a at least substantially surrounding the fastener and over which the caliper 20 slides. The sleeve is a hollow tube with a substantially circular cross-sectional profile. The head of the central bore of the sleeve is stepped so that the bolt 14a is able to hold the sleeve in place when tightened on to the brake carrier 30.

The bore 12a of the guide assembly 10a is an elongate hole extending from a first side (inboard) to the second side (outboard) of the caliper housing 22. The caliper 20 is slidably mounted with respect to the brake carrier 30 by sliding the guide pin 11a through the bore 12a. Hence, when the disc brake is actuated, the caliper 20 is able to slide in the axial direction A along the guide pin 11a.

The guide bush 13a is configured to form a close fit with the bore 12a and act as an inner liner in the bore. For heavy vehicle applications the internal diameter of the bush members is typically in a range of 25-40 mm. As can be seen in FIG. 2, the guide bush 13a does not extend the full depth of the bore 12a.

The guide bush 13a may be manufactured from steel, bronze, plastic, rubber or a composite of any of these, and may include a low friction coating such as PTFE. The guide bush 13a may have a plain inner surface or a suitable pattern of depressions to assist in the sliding of the caliper and the retention of lubricants. A convoluted bellows type seal 17 (FIG. 8) encircles the guide pin 11a and connects to the brake carrier 30 and brake caliper 20 to protect the first guide assembly 10a from contamination.

The diameter of the guide pin 11a is selected to correspond to the smallest diameter of the guide bush 13a. Accordingly, the clearance between the guide pin 11a and the guide bush 13a in the tangential direction Y is minimal and so vibration, noise, stress and excess wear are reduced. The largest diameter of the bush provides a greater clearance between the guide pin and the bush in the circumferential direction X to allow for a predetermined amount of play to accommodate manufacturing tolerances, heat expansion and brake torque induced deflection.

Figure 7:
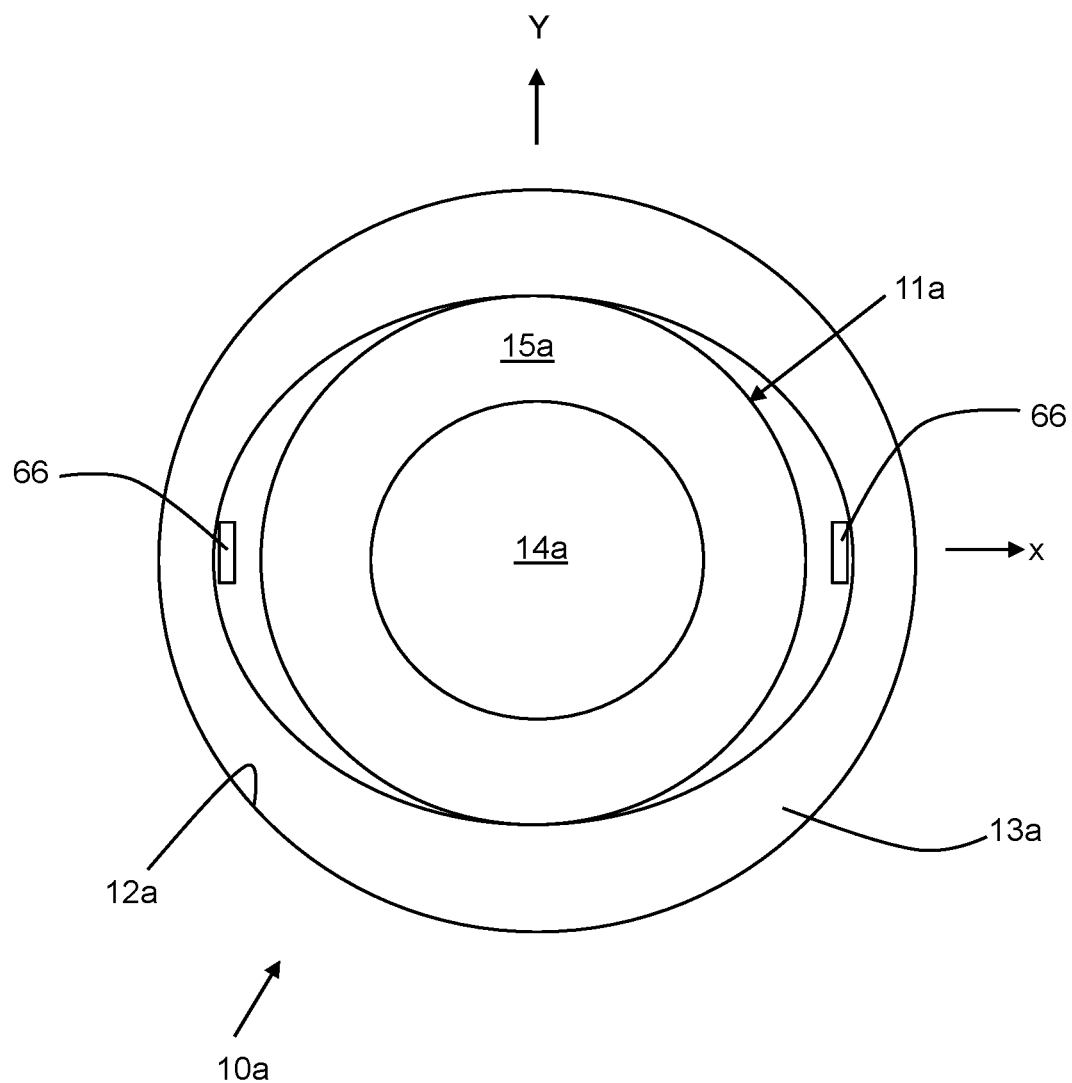
FIG. 7 shows an enlarged cross-sectional view of the guide assembly on the plane 6-6.
Figure 8:
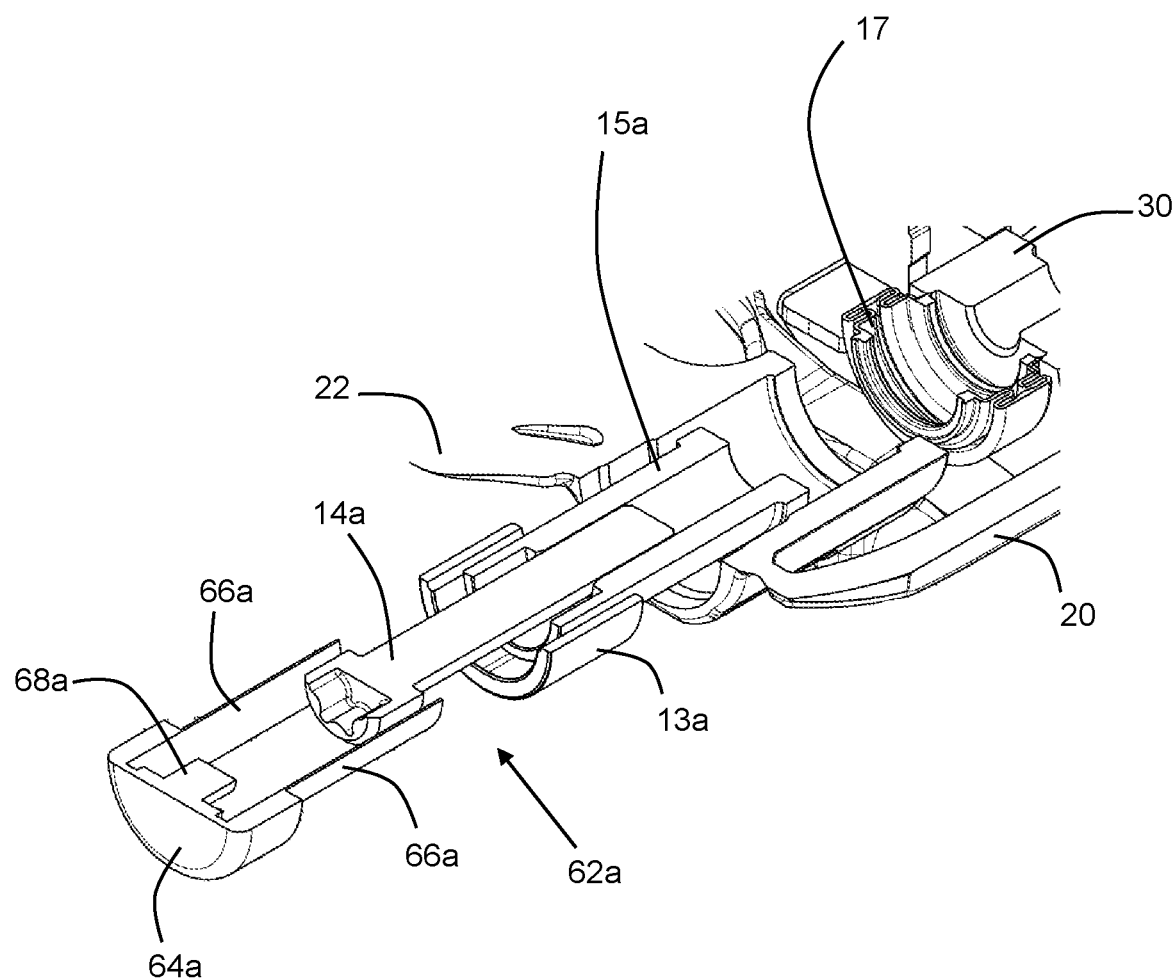
FIG. 8 shows an exploded cross-sectional view of the guide assembly of the first embodiment of the present invention.

With particular reference to FIGS. 6, 7 and 8, a wear sensor of the first embodiment of the present invention will now be discussed in more detail.

In order to inhibit the contamination of the first guide assembly 10a with foreign matter, a cap or cover 60a closes the inboard end of the bore 12a. Conventionally, covers used for this purpose are formed from metal and press fitted into the end of the bore 12a.

However, in this embodiment, the cover 60a is combined with a wear sensor 62a. As a result, construction of the cover 60a differs somewhat from conventional covers as discussed below. In this embodiment, the cover 60a continues to comprise a cap portion 64a that has a circular end face to close off the bore and a skirt portion arranged to extend inboard and frictionally engage the surface of the bore 12a.

However, in this embodiment, the cap portion 64a is formed from plastics resin material and is manufactured e.g., to overmold and at least partially encapsulate components of the wear sensor 62a. Specifically, in this embodiment the cap portion 64a partially encapsulates first and second sensor probes 66 at an inboard end of each probe, such that the probes extend outboard therefrom parallel to the axis A-A. In addition, the cap portion 64a encapsulates a signal processing part 68 of the wear sensor 62a. In this embodiment the signal processing part 68 projects inboard and is accommodated within a recess at the head of the bolt 14a.

Finally, the cap portion 64a also mounts a connector portion 70a of the wear sensor 62a on an inboard face of the cap portion 64a. The connector portion 70a provides in this embodiment a suitable connector such as a plug or socket for a cable that is arranged to extend to the vehicle (not shown) in which the disc brake is fitted. This enables the vehicle to provide an indication to a vehicle operator of the state of wear of the brake pads 50a and 50b, e.g., via a display on a dashboard of the vehicle, or some other form of audio/visual indicator.

Figure 4:
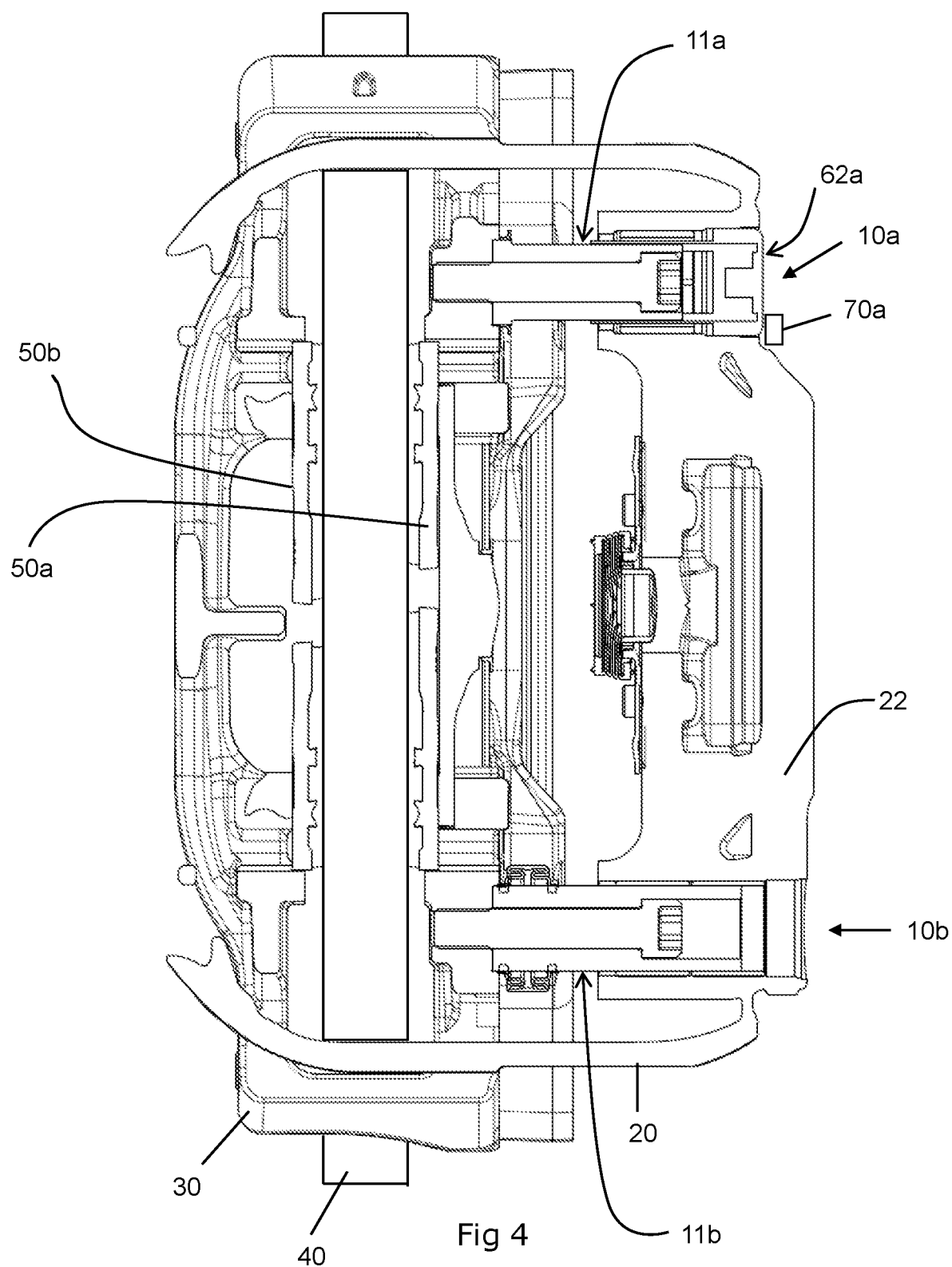
FIG. 4 shows the same cross-sectional view as FIG. 2, but with the brake pads worn.
Figure 5:
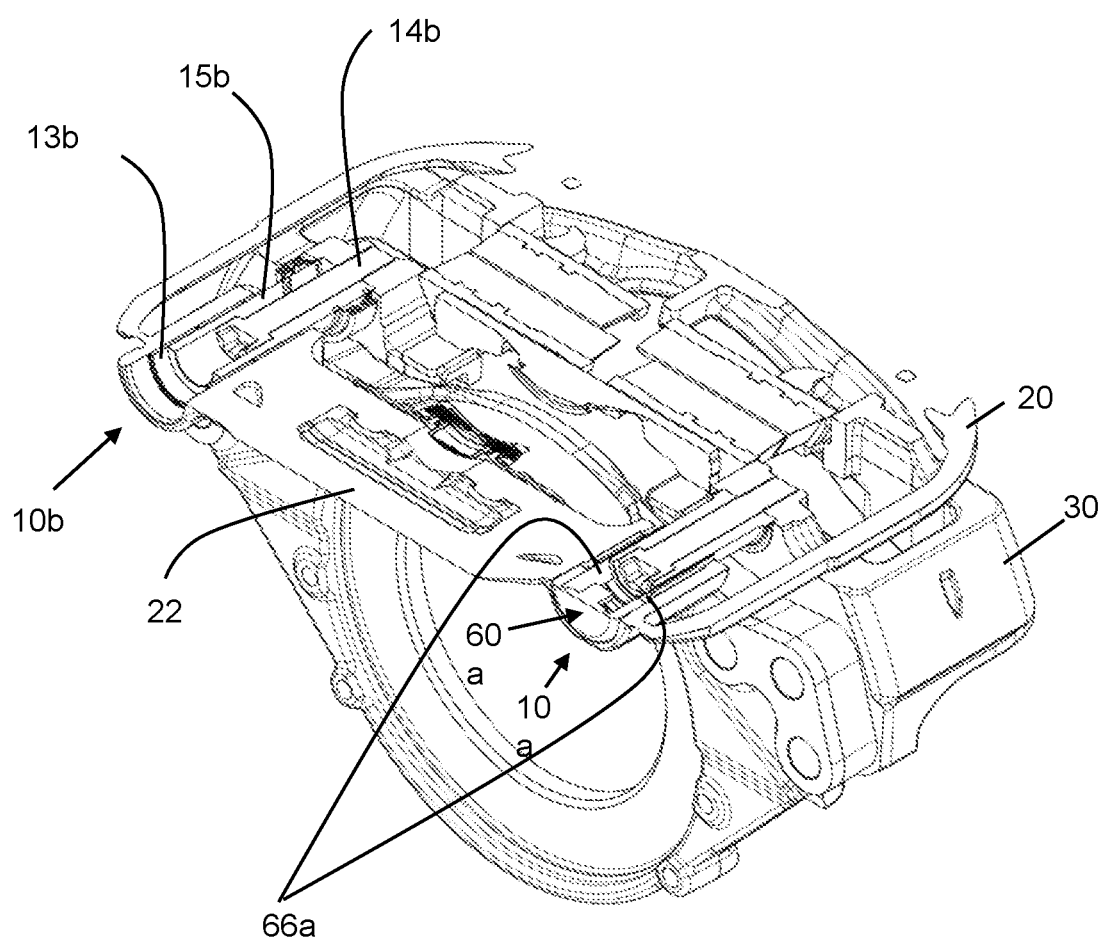
FIG. 5 shows an isometric, cross-sectional view the same as FIG. 3, but with the brake pads worn.

As can be seen clearly in FIGS. 6 and 7, the probes 66 extend outboard into the void provided between the guide pin 11a and guide bush 13a by virtue of the oval shaped inner profile of the guide bush. As such, the probes 66 extend alongside the guide sleeve 15a of the guide pin 11a and, as the friction material of the brake pads 50a and 50b wears away during usage of the disc brake 8, the relative position of the probes 66 with respect to the guide sleeve 15a changes. This may be seen by comparing the position of the probes 66 with respect to the guide sleeve 15a in FIGS. 2 and 3 which the friction material on the brake pads 50a and 50b is unworn, with the position in FIGS. 4 and 5 in which the friction material is substantially fully worn and the probes 66 have moved inboard by a distance equivalent to the cumulative wear of the friction material of the outboard pad 50b and any additional wear of material from the outboard face of the brake rotor 40.

In a preferred embodiment, the wear sensor 62a is a Hall Effect sensor and since the guide sleeve 15a is metallic the relative movement of the probes 66 with respect to the guide sleeve 15a results in a signal from the probes which can be used to derive the relative movement of probe and sleeve, and thereby the wear of the friction material.

In other embodiments, the sensor may be any other suitable sensor, such as an optical sensor. Further, the sensor probes may be embedded within the guide bush 13a, or specific recesses provided in the bush to accommodate the probes without the clearance between bush and sleeve being reduced by virtue of the presence of the probes. In further embodiments, if elastomeric, e.g., synthetic rubber bushes are used, the probes may be molded (encapsulated) into the bush to provide the void. In certain embodiments, the signal processing portion and/or connector portion may further be integrated into the bush rather than to the cover 60a. Further, the cover, bush and sensor may all be provided as a single component. In alternate embodiments, only a single probe or more than two probes may be used, and the signal processing portion may be omitted. The connector may be replaced by a cable arranged to extend to a remote location, e.g., on the vehicle.

Referring to FIG. 2, in a second embodiment of the present invention, the wear sensor is instead provided on the second guide assembly 10b, which has a guide bush 13b.

Figure 9:
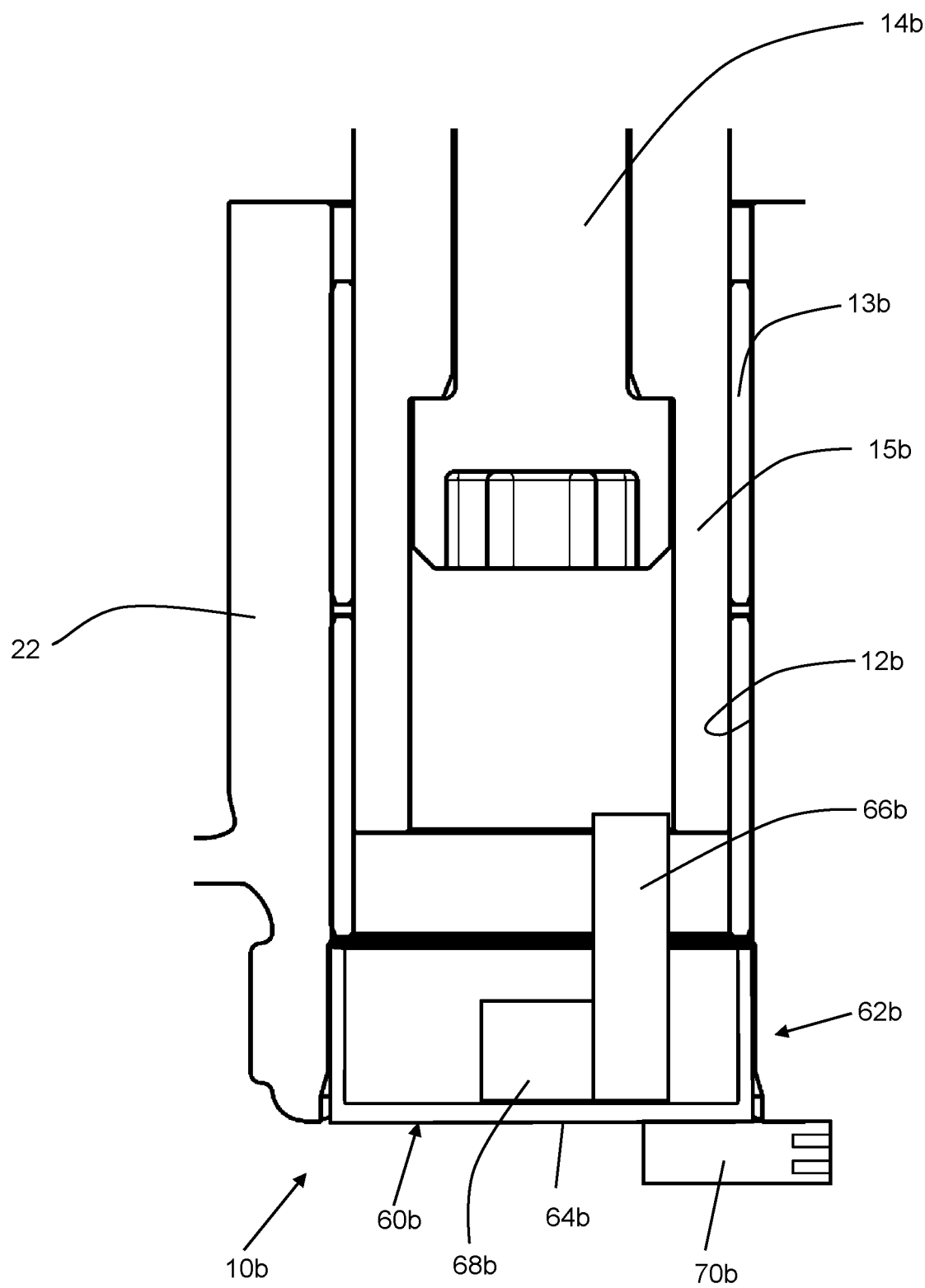
FIG. 9 is an enlarged cross-sectional view of the guide assembly of the second embodiment of the present invention.

As noted above, the second guide pin 11b is longer than the first guide pin 11a. However, both guide pins use bolts of the same length. This means that the sleeve 15b of the second guide assembly 10b has a significant void inboard of the head of the bolt 14b. The void is defined by the head of the bolt 14b, inboard portion of the sleeve 15b, and cap portion 64b of the cover 60b (see FIG. 9). In this embodiment, this void is utilized to provide space both for a sensor probe 66b that extends parallel to axis A-A proximate to the inboard end of sleeve 15b, as well as the signal processing portion 68b of the wear sensor 62b.

As in the first embodiment, the cap portion 64b is formed from a suitable plastics resin material and the sensor probe 66b, signal processing portion 68b and connector portion 70b are all preferably integrally molded to be at least partially encapsulated within the resin of the cap portion 64b. As in the first embodiment, the wear sensor 62b is preferably a Hall Effect type sensor and the relative movement of the sensor probe 66b to the second guide pin 11b, and in particular the sleeve 15b thereof, causes the readings in the wear sensor 62b to change, and therefore the wear of the friction material of the outboard brake pad 50b to be derived therefrom. It should be noted that by mounting the probe proximate to the sleeve, relative movement of the sensor and sleeve can be detected without additional components such as magnets mounted to the pin.

If the inboard and outboard brake pads wear at a similar rate, and are changed as a pair, the fact that the outboard brake pad has its wear sensed by the sensor of the first embodiment or the second embodiment means that the equivalent wear can be inferred for the inboard brake pad. However, it is contemplated that the sensor described above could be used in conjunction with a further sensor to determine the actual wear on the inboard brake pad. For example, a sensor that monitors the extension of a wear adjustment mechanism of the disc brake could be used to measure total wear of both brake pads and wear of the inboard pad could be calculated from the difference of total wear and outboard brake pad wear.

The embodiments of the guide assembly are suitable for use in any type of disc brake, including pneumatic, hydraulic, electrically and mechanically actuated disc brakes. However, the embodiments are believed to be particularly beneficial in air-actuated disc brakes for heavy commercial vehicles, where rotors typically have a diameter of between 30-60 cm, meaning that the torque and heat effects may be more significant than in hydraulic disc brakes for smaller, lighter vehicles.

Although the invention has been described above with reference to one or more preferred embodiments, it will be appreciated that various changes or modifications may be made without departing from the scope of the invention as defined in the appended claims.

What is claimed is:

1. A caliper guide assembly comprising:
a guide pin having a guide portion;
a guide bore having an opening and a guide surface arranged to receive the guide portion and permit relative axial sliding thereof;
a wear sensor arranged to detect a position of the guide pin in relation to the guide bore, the wear sensor including a signal processing portion; and
a cover arranged to close the opening of the guide bore, wherein the signal processing portion is mounted to the cover.

2. The caliper guide assembly of claim 1 wherein the signal processing portion is at least partially encapsulated within the cover.

3. The caliper guide assembly of claim 2 wherein the wear sensor includes a sensor probe, and wherein the sensor probe is at least partially encapsulated within the cover.

4. The caliper guide assembly of claim 2 wherein the wear sensor includes a connector portion, the connector portion having a connector for a cable that is arranged to extend to a vehicle in which the caliper guide assembly is fitted, and wherein the connector portion is at least partially encapsulated within the cover.

5. The caliper guide assembly of claim 2 wherein the cover is at least partially formed from a plastic resin material.

6. The caliper guide assembly of claim 1 wherein the cover includes a cap portion having an end face to close off the opening of the guide bore, and a skirt portion arranged to extend into the guide bore, and wherein the signal processing portion is mounted to the cap portion.

7. The caliper guide assembly of claim 6 wherein the signal processing portion is at least partially encapsulated within the cap portion.

8. The caliper guide assembly of claim 1 wherein a void accessible from the opening of the guide bore is provided within the caliper guide assembly, and wherein the void is partially defined by the cover.

9. The caliper guide assembly of claim 8 wherein the signal processing portion is at least partially located within the void, and/or wherein the wear sensor comprises a sensor probe that is mounted to the cover and that extends into the void.

10. The caliper guide assembly of claim 8 wherein the void is at least partially provided within a recess of the guide pin.

11. The caliper guide assembly of claim 10 wherein the guide pin comprises a fastener for securing the guide pin to a brake carrier, and a guide sleeve at least partially surrounding the fastener, wherein the void is at least partially defined by a head of the fastener.

12. The caliper guide assembly of claim 11 wherein the void is at least partially defined by a portion of the guide sleeve.

13. The caliper guide assembly of claim 1 wherein a connector portion is mounted to the cover, the connector portion providing a connector for a cable that is arranged to extend to a vehicle in which the caliper guide assembly is fitted.

14. The caliper guide assembly of claim 1 wherein the wear sensor is a Hall Effect type sensor.

15. A disc brake comprising:
a caliper that has a guide surface that at least partially defines a guide bore, the guide bore having an opening;
a guide pin having a guide portion that is slidable along the guide surface;
a wear sensor arranged to detect a position of the guide pin in relation to the guide bore, the wear sensor including a signal processing portion; and
a cover arranged to close the opening of the guide bore, wherein the signal processing portion is mounted to the cover.

16. A method of manufacturing a cover for a caliper guide assembly, the method comprising:
providing a wear sensor that is configured to detect a position of a guide pin in relation to a guide bore, the guide bore having an opening and a guide surface arranged to receive a guide portion of the guide pin and permit relative axial sliding thereof, the wear sensor having a signal processing portion; and
integrally molding the signal processing portion into the cover such that the signal processing portion is at least partially encapsulated within the cover.

17. The method of claim 16 wherein the wear sensor comprises a sensor probe and the method includes the step of integrally molding the sensor probe into the cover such that the sensor probe is at least partially encapsulated within the cover.

18. The method of claim 16 wherein the wear sensor comprises a connector portion that includes a connector for a cable that is adapted to extend to a vehicle in which the caliper guide assembly is fitted, and the method includes the step of integrally molding the connector portion into the cover such that the connector portion is at least partially encapsulated within the cover.

19. The method of claim 16 wherein the cover closes the opening of the guide bore and is at least partially formed from a plastic material.

20. The method of claim 16 wherein the cover comprises a cap portion having an end face adapted to close off the opening of the guide bore, and a skirt portion adapted to extend into the guide bore, and wherein the signal processing portion is integrally molded into the cap portion, such that the signal processing portion is at least partially encapsulated within the cap portion.

* * * * *